United States Patent [19]

Kleine

[11] Patent Number: 4,702,651
[45] Date of Patent: Oct. 27, 1987

[54] TOOL HOLDER FOR DRILLING MACHINES, DRILLING DEVICE AS WELL AS DRILLS AND SET OF DRILLS

[75] Inventor: Werner Kleine, Achim-Uesen, Fed. Rep. of Germany

[73] Assignee: Gebruder Heller GmbH, Werkzeugfabrik, Achim Uphusen, Fed. Rep. of Germany

[21] Appl. No.: 856,181

[22] Filed: Apr. 28, 1986

[30] Foreign Application Priority Data

Apr. 30, 1985 [DE] Fed. Rep. of Germany ....... 3515555

[51] Int. Cl.⁴ ...................... B23B 31/04; B23B 51/02
[52] U.S. Cl. .................................. 408/226; 279/19; 279/60; 408/240
[58] Field of Search .................. 408/226, 239 R, 240; 279/19-19.7, 60-69

[56] References Cited

U.S. PATENT DOCUMENTS

| | | | |
|---|---|---|---|
| 2,390,950 | 12/1945 | Lanfranconi | 408/226 |
| 4,491,445 | 1/1985 | Hunger et al. | 279/60 X |
| 4,512,692 | 4/1985 | Nielson | 408/226 |
| 4,536,109 | 8/1985 | Hunger et al. | 408/240 |
| 4,565,472 | 1/1986 | Brennsteiner et al. | 408/226 |
| 4,630,836 | 12/1986 | Hunger et al. | 279/66 X |
| 4,655,651 | 4/1987 | Hunger et al. | 408/226 |

Primary Examiner—Gil Weidenfeld
Assistant Examiner—Steven C. Bishop
Attorney, Agent, or Firm—Hopgood, Calimafde, Kalil, Blaustein & Judlowe

[57] ABSTRACT

1. A tool holder for drilling machines, drilling devices as well as drills and drill sets.

2. The tool holder, which is developed as a multi-jaw chuck, has a cylindrical bore 326 into which, with maximum opening of the holder, the jaws 322 engage, or the driver of each jaw has an end surface 416 which faces the hollow space of the holder and is interrupted by an axially extending rib 320.

The drilling device has a tool holder developed as multi-jaw chuck and a drill whose chucking shank is guided axially in the hollow space of the holder and has grooves for the engagement of radially inner parts of the jaws of the multi-jaw chuck.

In its chucking shank the drill has axially extending grooves for the engagement of the jaws of a multi-jaw chuck, within the bottom of which grooves, or at least in one of them, there is a trough which terminates at a distance from the rear end surface and is connected with said end surface by an introduction groove whose cross section is smaller than the cross section of the groove.

The drill set consists of drills having chucking shanks of different thickness. The thicker chucking shanks have at least two axially extending grooves for the engagement of the jaws and the thinner shanks have resting surfaces 416, not coaxial to their axis, for the resting against the jaws 322 of a multi-jaw chuck.

3. FIG. 6.

24 Claims, 7 Drawing Figures

TOOL HOLDER FOR DRILLING MACHINES, DRILLING DEVICE AS WELL AS DRILLS AND SET OF DRILLS

BACKGROUND OF THE INVENTION

The present invention relates to the art of drilling, particularly rock drilling, by means of drilling machines, in particular drilling hammers. For the drilling of holes of different diameters, drills of different diameters must be used, the different chucking shanks of which must be capable of being chucked in one and the same tool holder, insofar as possible. In this connection, the problem arises that, despite the different force exerted on the tool holder when drilling holes of different diameters, the drills must in all cases be dependably driven by the tool holder and disturbances must be avoided insofar as possible. In the case of hammer drills there is also the additional problem that the chucking shanks of the drills, when the blows are exerted on the end surface of the chucking shank, must be properly guided axially in the tool holder without being pushed out, even in the case of extremely thick or thin chucking shanks.

From Federal Republic of Germany, No. OS 3,118,691, there is known a tool holder for drilling hammers which, for the chucking of chucking shanks of drills of different thickness, has at least two jaws for which a jaw holder is present which is provided with a hollow space for receiving the chucking shanks to be chucked and into which, upon the clamping fast of the chucking shanks, the jaws, which are mounted radially insertable and lockable in the jaw holder, engage via their drives.

BRIEF STATEMENT OF THE INVENTION

The invention has as its objective first of all to develop a tool holder of the character indicated such that it solves the aforementioned problem, even for drills having thick drill shanks.

According to the invention, the hollow space of the jaw holder is cylindrical and, with the maximum opening of the tool holder to receive chucking shanks whose diameter corresponds to the diameter of the hollow space of the jaw holder, the radially inner parts of the drivers protrude radially into said hollow space. In this way, dependable guidance of the thickest drill shanks intended for the tool holder is assured by the cylindrical wall of the hollow space when using for this purpose drills having a chucking shank which has at least two axially extending grooves for the form-locked engagement of the drivers of the tool holder, at least one of said grooves terminating at a distance from the rear end surface of the chucking shank and being connected with said rear surface by an introduction groove whose cross section is smaller, and preferably flatter, than the cross section of the groove. It is now necessary merely to see to it that, with the tool holder in maximum open position, the jaws engage into the hollow space of the jaw holder only to such a depth that, for the insertion of the chucking shaft into the tool holder, the cross section of the introduction groove comprises the cross section of the part of the jaw engaging into the hollow space. In this way, assurance is had at the same time that the drill shank can be introduced into the tool holder only in a position in which the jaws of the tool holder are exactly aligned with the grooves of the chucking shaft.

A drill which is developed in this manner forms, together with the tool holder of the invention, a drilling device in accordance with the invention with which the drill is dependably guided in the tool holder by the cylindrical wall of the hollow space, the outer circumference of the tool holder being limited to a minimum by the engagement of the jaws when the tool holder is in its maximum open position.

This outside circumference of tool holders for drilling machines should not exceed a given diameter, for instance 43 mm, since, for instance, drilling hammers are provided behind the chuck with a chucking neck which is, for instance, standardized for the attachment of the front handle of the drilling hammer or for clamping in drilling stands or other attachment devices.

The invention furthermore also resides in the fact that the aforementioned tool holder for drilling machines is so developed that it solves the aforementioned problem for drills having thin and very thin chucking shanks. This object is achieved in accordance with the invention in the manner that the driver of each jaw has an end surface which faces the hollow space of the jaw holder and is interrupted by a longitudinal rib which extends axially to the axis of the hollow space. As a result, in drills with thicker chucking shanks, the grooves can be developed for the introduction of the radially inner parts of the jaws and that in the case of drills with thin chucking shafts in which the moments of rotation to be transmitted are small, the small groove is then sufficient for the engagement of the rib of the jaw while with increasing diameter of the chucking shank the grooves for the engagement of the jaws can become deeper and deeper, so that not only the ribs but, in particular, also the radially inner parts of the jaws themselves form drivers.

The above-mentioned two developments, in accordance with the invention, of the tool holder for very thick and thin chucking shanks, can also be combined, in accordance with the invention, in one tool holder so that, in this way, the aforementiond problem is excellently solved in a particularly advantageous manner for all diameters of the drill shanks.

In one advantageous embodiment of the tool-holder developments, in accordance with the invention, the flanks of each jaw can form with each other an angle of 360°/n, for instance 120° when n (the number of jaws) is 3; this relation allows the jaws to be set and locked up, to the point of abutting their flanks against each other. As a result, when the thinnest chucking shafts are clamped, the flanks of the jaw which engage deepest into the hollow space of the jaw holder are mutually abutted, thus further stabilizing the connection between drill and tool holder.

The development of the tool holder in accordance with the invention forms, together with a drill bit of the invention, a drilling device for drill bits having chucking shafts of smaller diameter than the diameter of the hollow space of the jaw holder when the chucking-shank portion of the drill bit is deformed from its initially cylindrical shape, to a standardized jaw-receiving shape, and if each jaw has a front (i.e., an inward-end) surface facing the hollow space of the tool holder, wherein the front surface of the jaw is configured for relative wide-base large-area conformance to a deformed region of the chucking shank of the drill bit.

Since the front surfaces of the jaws do not change upon the chucking of chucking shanks of different diameters, the resting surfaces of the drill shanks which are adapted to these front surfaces also do not change. This has the result that the thinner drills do not require grooves for the engagement of the jaws since the front and resting surfaces which are not concentric to the axis of the drill assure transmission of the torque from the tool holder to the drill without, as already stated, the chucking shank being weakened by grooves, which is of particularly great importance in the case of extremely thin chucking shanks.

In the case of thicker chucking shanks it is, of course, advisable to provide grooves for the engagement of the jaws.

In one advantageous embodiment of such a drill, it is provided that at least the torque-sustaining side wall of each groove is in a radial plane of the chucking shank or is inclined with respect to said plane by its radially outer limitation in a direction of rotation opposite the direction of rotation of the drill. In this way, the result is obtained that, in the transmission of torque from the tool holder to the drill, the jaws are subjected to no radial forces by which, particularly in the case of thicker chucking shanks, the jaws could be pushed out of engagement with the grooves of the chucking shanks.

If the above-indicated inventive features of the tool holders are combined in one tool holder there then results for such a tool holder an inventive set of drills having chucking shanks of different thickness, which set is characterized by the fact that the thicker chucking shanks have at least two axially extending grooves for the engagement of drivers of the tool holder and the thinner chucking shanks are provided with torque-sustaining surfaces which are not concentric to the axis of the chucking shanks. As a result, in the case of thick chucking shanks, which are only insignificantly weakened by grooves, drive by engagement of the jaws is obtained, and it is possible for this engagement to be adapted to specific requirements by deepening the grooves of thicker chucking shanks. In the case of thin chucking shanks, however, a groove is not absolutely necessary since by the forming thereon of jaw-engagement surfaces which are not concentric to the axis of the chucking shanks, drive is assured if these surfaces are so adapted to the end surfaces of the jaws of the tool holder that they have area-engagement against each other; such thin drills would then, admittedly, not be suitable for drill hammers.

Upon the use of tool holders of the invention which are suitable for drill hammers and in which the front surfaces of the jaws are interrupted by a rib extending axially to the axis of the hollow space, the driving of the thinner drills can be obtained in the manner that in the chucking shanks thereof the grooves have approximately the same cross section as the ribs of the jaws, so that the ribs engage into the grooves. In this case, area-conforming application of chucking-shank surfaces against the front surfaces of the jaws is not always absolutely necessary, but it is advantageous.

DETAILED DESCRIPTION

The invention is explained in detail in the following description of illustrative embodiments, in conjunction with the accompanying drawings, in which.

Figure 3:
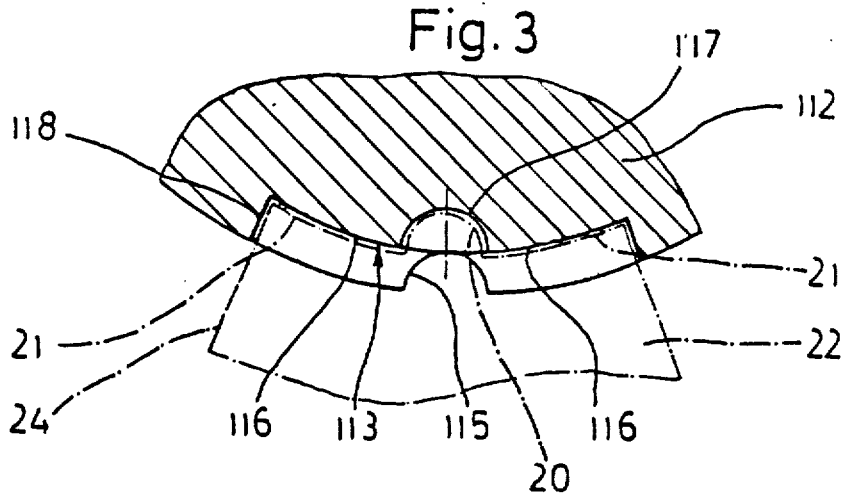
FIG. 3 is an enlarged fragmentary section along the line III—III of FIG. 2, wherein part of one jaw of a three-jaw chuck of the invention is shown in phantom outline.
Figure 4:
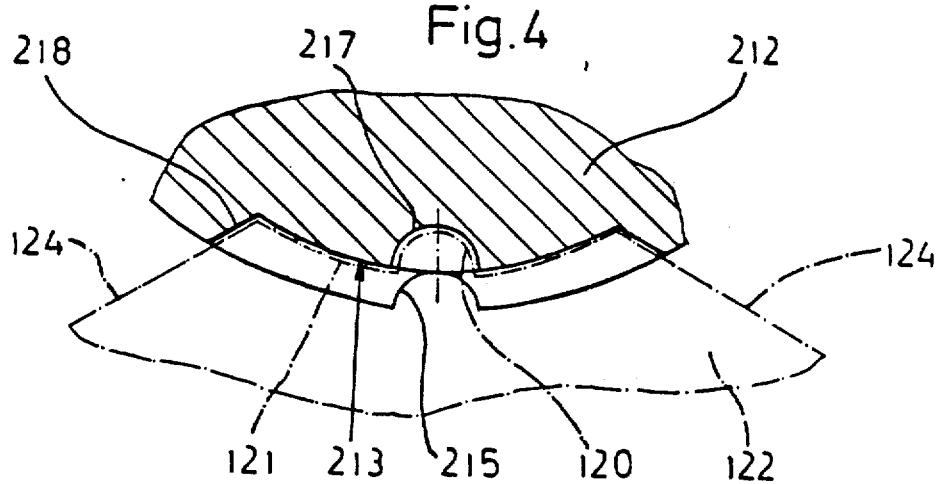
Figure 5:
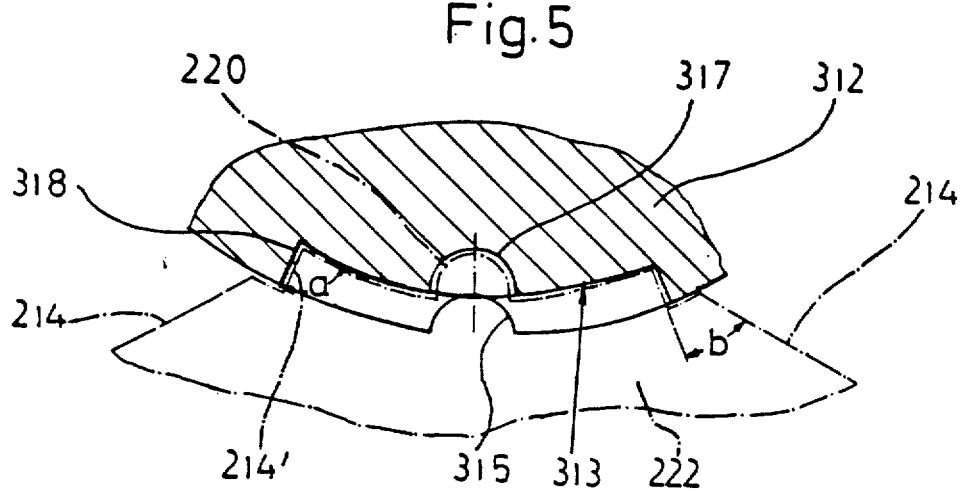
Figure 6:
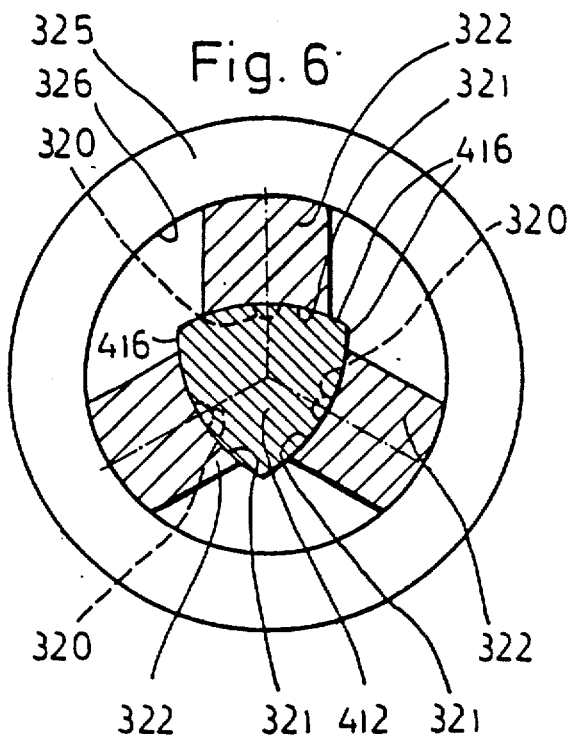
Figure 7:
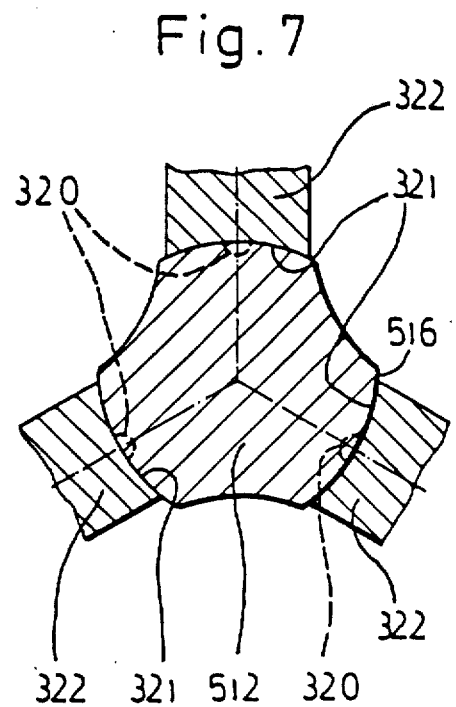

FIGS. 4 and 5 are sectional views corresponding to FIG. 3 wherein corresponding jaw parts of two different multiple-jaw chucks of the invention are shown in phantom outline; FIGS. 6 and 7 are diagrammatically simplified cross sections through a three-jaw chuck having chucking shanks of different diameter chucked therein, the jaw holder of the three-jaw chuck being shown merely diagrammatically in front-end elevation.

Figure 1:
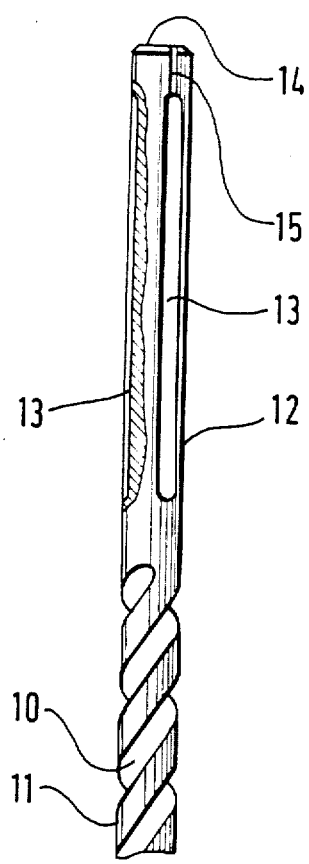
FIG. 1 is a fragmentary side view of part of a drill bit having a chucking shank of the invention, the view being partly broken away and in longitudinal section.

In FIG. 1, a drill bit for a rotary hammer comprises a working shank 11 having a cutting tip (not shown in the drawing) and a removal groove 10, and a chucking shank 12 having an outside diameter adapted to the outside diameter of the working shank 11. The chucking shank has three straight, axially extending grooves 13 arranged an equal angle apart. Each groove 13 is intended for the engagement of an axially extending rib 20 which protrudes radially inwardly from the front surface 21 of radially adjustable jaw 22 of a three-jaw chuck (see FIG. 3). The grooves 13 extend over only a part of the length of the chucking shank 12, so that their rear ends are at a distance from the rear end surface 14 of the chucking shank 12. Each groove 13 is connected with the rear end surface 14 by an introduction groove 15 the cross section of which is smaller than the cross section of the groove 13 but still sufficiently large that the radially inner part of the rib 20 can engage into the introduction groove.

In this way, the result is obtained that when the jaws 22 of the chuck are so adjusted that the radially inner part of the rib engages into the introduction groove of the chucking shank 12, the chucking shank can be introduced axially into the chuck only in a position in which the introduction grooves 15 are aligned with the ribs 20 of the jaws 22. If the chucking shank is then introduced so deep into the chuck that the ribs 20 come against the front end of the grooves 13, then the ribs 20 are simultaneously aligned with the grooves 13, so that by the tightening of the chuck the ribs 20 engage properly into the grooves 13, thus assuring the centering of the drill.

Figure 2:
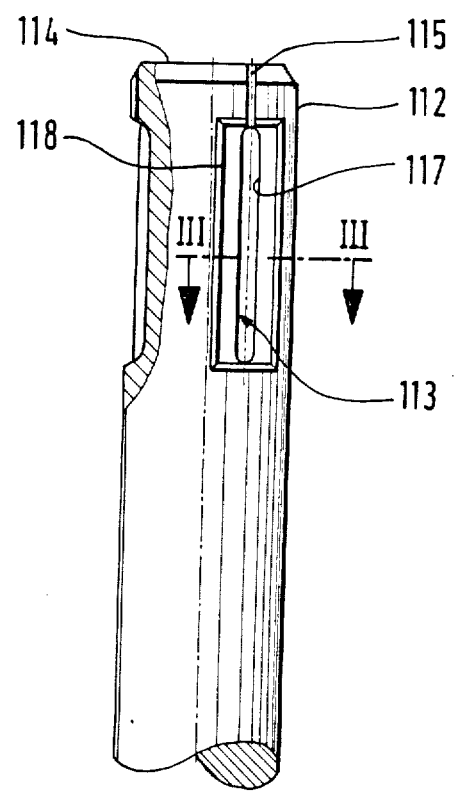
FIG. 2 is a showing, corresponding to FIG. 1, of a modified construction, embodied in a large-diameter drill bit, for use with one and the same three-jaw chuck as for the drill bit of FIG. 1.

FIG. 2 shows the thick chucking shank 112 of a larger-diameter drill bit which is intended for coaction with the same three-jaw chuck, shown in FIG. 3, as for the drill bit of FIG. 1. In order to transmit substantially greater torque to the thicker chucking shank 112, grooves 113 are provided which are intended not only to receive the rib 20 but also to receive the radially inner part of the jaws 22 so that this part of the jaws forms drivers. The bottom of this groove 113 forms a resting surface 116 for the front surface 21 of the jaw 22, and a trough 117 is provided in the bottom of groove 113 for the engagement of the rib 20; the cross section of trough 117 corresponds to that of groove 13 in the embodiment of FIG. 1. The groove 113 is connected with the rear end surface 114 of the chucking shank by an introduction groove 115 which is precisely as long as the introduction groove 15. The groove 13 of the thin chucking shank of FIG. 1 is, however, substantially longer than the groove 113 of the thicker chucking shank of FIG. 2. As a result, the drill of FIG. 1 can be used both with three-jaw chucks in which the jaws 22 are only radially adjustable (i.e., without axial displacement) as well as with jaws in which, upon radial displacement of the jaws 22 to small diameters, the jaws at the same time move axially forward.

In the embodiment of FIG. 3, the introduction groove 115 has approximately the same cross section as the rib 20 and thus as the trough 117. The introduction groove can, however, in this case also be larger. The essential thing is merely that it permits the introduction of the jaw in the condition in which it still does not fully engage the chucking shank, so that upon completion of chucking engagement to the chucking shank, the rear end of the grooves 113 forms a stop which prevents the drill from being thrown out of the chuck.

The flank 24 of the jaw 22, which transmits the torque of the three-jaw chuck upon drilling, lies, in the case of the largest opening of the three-jaw chuck, substantially in a radial plane of the three-jaw chuck. The abutting side wall 118 of the groove 13 has a corresponding inclination. In this way, upon the transmission of the torque from the jaws to the drill bit, no radial force is produced on the jaws which could result in the jaws being forced out of the groove 113.

The front surface 21 of jaw 22 is cylindrical. Its radius of curvature corresponds to the radius of curvature of the thickest chucking shank 12, in which case groove 13 is provided only for the entry of the rib 20. As a result, with the thinner drills the rib 20 can always enter fully into the involved groove 13. In the case of chucking shanks according to FIGS. 6 and 7, as will be described in further detail below, the resting surfaces 416 and 516 are formed on the chucking shanks 412 and 512. Thus, in the case of thinner chucking shanks, upon transmission of the torque from the three-jaw chuck to the drill bit, a reaction force unavoidably presses the jaws radially outward, but such a force does not occur in the case of the thickest chucking shank. This fact is advantageous, in that the unavoidable force which presses the jaws radially outward is less and can be controlled more easily in the case of the thinner chucking shanks 412 and 512 of thinner drill bits.

FIG. 4 shows a modified embodiment both of the chucking shank 212 of a drill bit and of the jaw 122 of a three-jaw chuck. In this embodiment, the jaw 122 differs from the jaw 22 of FIG. 3 in that the flanks 124 of each jaw 122 form an angle of 120° with each other and that the three-jaw chuck is so designed that the jaws are adjustable and lockable up to abutment of the flanks 124 against each other. In this way the result is achieved that with very thin chucking shanks, in which case the jaws enter furthest into the inside of the hollow of a jaw holder (not shownn in the drawing), the jaws, by this abutment against each other, unequivocally guide the engaged chucking shank. In this connection, it is to be borne in mind that in the case of a drill hammer, chucking does not mean a tight clamping since the jaw is merely to center the chucking shank, and must permit it axial movement.

As shown in FIG. 4, the flanks 124 of the jaws, and thus the side walls 218 of the groove 213 of all diameters of chucking shanks 212 which are provided with grooves 213 for the entry of the radially inner parts of the jaws 122, have an inclination which produces a force which presses the jaws radially outward.

In order to prevent this radially outward force development, in the embodiment of FIG. 5 wherein each jaw 222 has flanks 214 which are inclined 120° with respect to each other, the radially inner or driver part of each jaw 222 is formed with driver flanks 214' to engage into modified torque-sustaining grooves 313 of the chucking shank 312. Each of the torque-transmitting driver flanks 214' is so inclined away from the direction of chuck rotation (i.e., away from the radial plane which includes the axis of the jaw holder) that, for the largest chuck shank receivable in the opening of the three-jaw chuck, the torque-reaction force on the jaws is radially inward, or at least not radially outward. In this way, the advantages of the embodiment of FIG. 3 and of the embodiment of FIG. 4 are combined in the case of the embodiment of FIG. 5.

FIGS. 6 and 7 show merely diagrammatically how, by shaping the chucking shank 412 and 512 of a drill, with the same development as that of the front surfaces 321 of the jaws 322 of a three-jaw chuck which are mounted in radially adjustable and lockable manner in a jaw holder 325, torque can be transmitted from the three-jaw chuck to the chucking shank without providing grooves in the chucking shank.

In combination with the grooves 113, 213 and 313, shown in FIGS. 2 to 5, for entry of the radially inner driver part of jaws 22, 122 and 222, the result can be obtained that, with one and the same three-jaw chuck, thick chucking shanks can be provided with these grooves and thin chucking shanks can be so shaped, merely by reshaping in accordance with FIGS. 6 and 7, that torque can be transmitted even without such grooves; thus, the ribs 20, 120 and 220 of the embodiments of FIGS. 3 to 5 can also be omitted if the chuck is to be used only for simple drilling machines or impact drilling machines in which the chucking shank is clamped tight in chucked position.

In the case of drill hammers, however, the ribs 320 shown in dashed line in FIGS. 6 and 7 are still necessary, to prevent (via the stop at the rear end of the requisite chucking-shank grooves corresponding to the grooves 13 of FIG. 1) an axially displaceably chucked drill bit from being thrown out by blows of the hammer.

In this way, there is thus obtained for a suitably developed three-jaw chuck a drill set in which the thicker chucking shanks have three axially extending grooves 113, 213 or 313 for the engagement of drivers of the three-jaw chuck and in which the thinner chucking shanks are provided with resting surfaces 416 and 516, respectively, which are not concentric to the axis of the chucking shanks. In an embodiment without ribs 320, these resting surfaces 416, 516 would have to be adapted to the front surface 321 of the jaws 322 which is at all times the same; but such adaptation would not be necessary in the case of chucking shanks having ribs 20.

By the use of the grooves 113, 213 or 313 according to FIGS. 3 to 5, a particularly advantageous embodiment can be provided for the thickest chucking shanks. In known three-jaw chucks, the jaws 22, 122, 222, 322 are guided in a jaw holder 325 (indicated merely diagrammatically in FIG. 6), which has a bore 326 into which the chucking shanks 12, 112, 212, 312, 412, 512 of drill bits can be inserted and in which the chucking shanks can then be clamped by the jaws 22, 122, 222, 322. It is thus possible to form bore 326 as a cylinder, with the jaws being pulled entirely out of the hollow space (bore 326), for the largest opening of the three-jaw chuck. A chucking shank of large diameter corresponding to the inside diameter of the hollow space (bore 326), can therefore be inserted into and guided axially by said inside hollow space; having inserted such a large chucking shank, the retracted jaws are then introduced into the grooves to complete the chucking operation.

One particularly advantageous possibility results if introduction grooves 115, 215 or 315 are also provided at the same time as the grooves 113, 213, 313 for the introduction of the radially inner parts of the jaws. It is then possible to use the cylindrical hollow space of the jaw holder of the three-jaw chuck for the guidance of the thickest chucking shank without having to retract the jaws completely out of the hollow space. This makes it possible to develop the three-jaw chuck with a smaller outside circumference, with resulting advantages. The introduction grooves provided on the chucking shank then make it possible to introduce the thickest chucking shank into the three-jaw chuck despite its guidance by the bore 326, while at least part (320) of each jaw 322 can protrude into the hollow space 326 for angular registry with the introduction grooves.

As shown in FIGS. 3 to 5, the two side walls 118, 218 and 318 of the grooves 113 and/or 213 and 313 form equal angles with each other. In order now that, in the case of drills of different thickness, the jaws always engage as far as possible into these grooves without play, it is provided in the embodiments that the distances of the radially inner limitations of the said side walls from each other are identical in all of these drills.

In known multi-jaw chucks, and thus also in the case of the presently described three-jaw chucks, a manually actuatable adjustment member will be understood to be provided for adjusting and locking the jaws 22, 122, 322 to a desired diameter. To make the function of the introduction groove as simple as possible, it is provided in the embodiments shown that markings are present on the jaw holder 325 for those positions of the adjustment member (not shown in the drawing) in which the drivers of the jaws engage radially so deep into the hollow space 326 of the jaw holder 325 that the desired chucking shank 12, 112, 212 and 312 can be introduced into the chuck only in a position in which the rib 20 serving as driver in the case of the drill according to FIG. 1 or the driver formed by the radially inner part of the jaws 22, 122, 222 in the case of the drills having thicker chucking shanks engages into the introduction groove 15, 115.

When describing the embodiment of FIG. 3 it was stated that the flank 24 of the jaw 22 which transmits the torque of the three-jaw chuck lies substantially in a radial plane of the three-jaw chuck when the three-jaw chuck is at its maximum opening. This constitutes an advantageous embodiment. However, this is not necessary since, upon the drive of the drill, due to the force exerted between the side wall 118 and the flank 24 (of the groove 113 and the jaw 22 respectively), a frictional force is produced which can prevent the forcing out of the jaw 22 even in the event of an unfavorable inclination. It is merely important in this connection that the flank 24 which transmits torque from the tool holder to the drill be so inclined, with the different openings of the tool holder, to the immediately adjacent radial plane of the jaw-holder hollow space 326 (FIG. 6) that the radial forces possibly acting radially outward on the jaws are no greater than the friction forces between the flanks 24 of the jaws and the side walls 118 of the grooves 113.

All features mentioned in the above description as well as all those features which can be noted merely from the drawing constitute, as further developments, a part of the invention, even if they have not been particularly emphasized and, in particular, not mentioned in the claims.

I claim:

1. A tool holder for drilling machines which has at least two jaws for the chucking of drill-chucking shanks of different thickness, wherein a jaw holder has a hollow space to receive chucking shanks to be chucked and wherein the jaws are radially adjustable and lockable in the jaw holder for selective engagement with an inserted chucking shank, characterized in that the hollow space is cylindrical and defines a supporting guide bore for reception of chucking shanks of maximum diameter conforming to the bore diameter, that each of the jaws has a radially inwardly extending longitudinal drill-bit engageable rib formation, and that in the fully retracted position of the jaws, only an inner part of said rib formations intrudes into the geometric cylinder of the hollow space, whereby a drill-bit chucking shank of said maximum diameter and characterized by entry grooves conforming to the intrusions of said rib formations may be inserted into said space in angularly located registry with said rib formations.

2. A tool holder for drilling machines which has at least two jaws for the chucking of drill-chucking shanks of different thickness, wherein a jaw holder has a hollow space to receive chucking shanks to be chucked and wherein the jaws are radially adjustable and lockable in the jaw holder for selective engagement with an inserted chucking shank, characterized in that the hollow space is cylindrical and defines a supporting guide bore for reception of chucking shanks of maximum diameter conforming to the bore diameter, that each of the jaws has a drill-bit engageable front surface which is cylindrically arcuate and which substantially conforms to the geometric cylinder of said space in the retracted position of the jaws, and said front surface of each jaw is interrupted by a longitudinal rib formation which in the retracted position of the jaws intrudes only partially into the geometric cylinder of said space.

3. A tool holder according to claim 1 or 2, characterized in that each jaw has a flat torque-transmitting flank which is so inclined with respect to a geometric radial plane defined by the axis of the geometric cylinder and by the radially adjustable direction of said each jaw as to effectively preclude development of radially outward reaction-force application to said each jaw when the torque-transmitting flank thereof is in driving engagement with a groove sidewall of an inserted drill-bit chucking shank.

4. A tool holder according to claim 1 or 2, characterized in that each jaw has a flat torque-transmitting flank which is so inclined with respect to a geometric radial plane defined by the axis of the geometric cylinder and by the radially adjustable direction of said each jaw as to effectively preclude development of radially outward reaction-force application to said each jaw when the torque-transmitting flank thereof is in driving engagement with a groove sidewall of an inserted drill-bit chucking shank, the inclination of each torque-transmitting flank being such that in the fully retracted jaw position, each flank is substantially in a radial plane of the hollow space.

5. A tool holder according to claim 1 or claim 2, in which the number of jaws is at least three and each jaw has two flat flanks adjacent its drill-bit engageable front surface, the two flanks for each jaw forming an angle of 360°/n with each other, where n is the number of jaws, and in which said jaws are lockably adjustable to a radially inner limiting position in which adjacent flanks of adjacent jaws are in mutual abutment.

6. A tool holder according to claim 1 or claim 2, characterized by the fact that, to assist in manual adjustment of the jaws to a desired diameter of chucking shank, markings on the jaw holder are indicative of those positions of the adjustment member in which the jaws are radially so positioned as to accept insertion of a chucking shank of desired diameter in only one angular relation of rib formations with respect to entry grooves of an inserted drill bit.

7. A drilling device comprising a tool holder with a jaw holder having a hollow space to receive a chucking shank to be chucked, and a drill bit having a chucking shank receivable in the hollow space, wherein plural jaws are radially adjustable and lockable in the jaw holder for selective releasable engagement with the chucking shank, characterized in that the hollow space is cylindrical and the chucking shank has a cylindrical circumferential surface so conforming to the geometric cylinder of said hollow space that the hollow space forms an axial guide for the chucking shank, that each of the jaws has a radially inwardly extending longitudinal drill-bit engageable rib formation, and that the chucking shank is characterized by chucking grooves configured for angularly locating axially inserted reception of the chucking shank.

8. A drilling device according to claim 7, in which at least one of said grooves terminates short of the chucking-shank end of the drill bit and is connected with said end by an introduction groove of cross-section less than that of said one groove, said rib formation being enterable in said introduction groove for one adjusted radial position of said jaws, and said rib formation being axially retained in said one groove for a second further radially inward position of said jaws, once the introduction groove of the chucking shank has cleared the involved rib formation.

9. A drilling device according to claim 8, in which said drill bit is one of a set which includes a second drill bit having a chucking shank that is thinner than that of the first-mentioned drill bit, the chucking shank of said second drill bit also having chucking-groove and introduction-groove formations, each of the jaws having a drill-bit engageable front surface of predetermined contour, and the chucking shank of each drill bit being contoured for chucking engagement with said predetermined contour.

10. A drilling device according to claim 9, in which for the case of said second drill bit, the contouring of said groove formations and to said predetermined contour is the product of drill-bit material displacement from an initially cylindrical chucking-shank end of said drill bit.

11. A drilling device according to claim 8, in which said rib formation is the angularly central portion of the drill-bit engageable front surface of each jaw, said front surface being otherwise cylindrically arcuate with substantial conformance to the geometric cylinder of said hollow space in the fully retracted position of the jaws, each jaw having side flanks defining angular limits of its said front surface; in which each groove of said chucking shank is configured for radial entry and seated reception of the front surface of one of said jaws; and in which at least one of said grooves has a relatively shallow-depth entry-groove formation of section accommodating said rib formation to the exclusion of said front surface.

12. A drilling device according to claim 11, in which said chucking grooves are characterized by groove bottoms that are cylindrically arcuate and conform to the cylindrically arcuate front surfaces of the jaws, the central region of each of the groove bottoms being interrupted by a longitudinal trough formation in which a rib formation is receivable for the chucked condition of said device.

13. A drill bit for selective retention by the multiple-jaw chuck of a portable rotary drill, said drill bit having a chucking shank which has at least two angularly spaced longitudinal chucking grooves having bottom surfaces which are cylindrically arcuate about the axis of the drill bit, the central region of each groove bottom being characterized by a longitudinal trough.

14. A drill bit for selective retention by the multiple-jaw chuck of a portable rotary drill, said drill bit having a cylindrical chucking shank which has at least two angularly spaced longitudinal chucking grooves, said grooves having bottom surfaces which are convex and cylindrically arcuate to equal radii and about their respective axes, said respective axes being parallel to and equally offset from the drill-bit axis, and said equal radii being equal to or greater than the cylindrical radius of the chucking shank.

15. A drill bit according to claim 13 or claim 14, in which the number of grooves is at least three, and in which each of said grooves has two flat sidewalls in geometric planes which include the axis of the drill bit and which diverge on opposite sides of a central geometric plane of symmetry, to the extent of a divergence angle of substantially $180°/n$ from the plane of symmetry, where n is the number of grooves.

16. A drill bit according to claim 13 or claim 14, in which the number of grooves is at least three, and in which each of said grooves has two flat sidewalls in geometric planes which diverge on opposite sides of a central geometric plane of symmetry which includes the axis of the drill bit, the angle of divergence of said sidewalls from the central plane of symmetry being less than $180°/n$, where n is the number of grooves.

17. A drill bit for selective retention by the multiple-jaw chuck of a portable rotary drill, said drill bit having at one end a chucking shank which has at least two axially extending chucking grooves for keyed engagement to the chuck jaws, characterized in that at least one chucking groove terminates at a chucking-groove end which is short of said drill-bit end, and said chucking-groove end communicates directly with said drill-bit end via an introduction groove of smaller section area than that of the chucking groove, and the introduction groove being narrower than the chucking groove, whereby the terminated end of the chucking groove provides a sure abutment for an engaged chuck jaw.

18. A drill bit according to claim 17, in which each chucking groove has a central longitudinally extending trough formation of sectional area which is substantially congruent with the section area of said introduction groove.

19. A set of drill bits having chucking shanks of different thicknesses wherein at least one thicker chucking shank has at least two axially extending chucking grooves for keyable engagement to separate jaws of a chuck, and wherein at least one thinner chucking shank has at least two axially extending jaw-engageable surfaces which are not concentric to the axis of said thinner chucking shank.

20. A drill-bit set according to claim 19, in which the jaw-engageable surfaces of all drill bits are at least in part to identical jaw-engageable contour.

21. A drill-bit set according to claim 19, in which the drill bit with the thickest chucking chucking shank has a cylindrical circumference with at least two angularly spaced chucking grooves therein.

22. A drill-bit set according to claim 19, in which the chucking grooves of the thicker chucking shank are each characterized by a groove bottom having an angularly central longitudinal trough, and in which each jaw-engageable surface of the thinner chucking shank is a longitudinal groove of cross-section that is at least substantially congruent to the cross-section of the bottom part of the trough.

23. A drill-bit set according to claim 19, in which each of said chucking shanks has at least two axially extending chucking grooves, the respective chucking grooves of both the thicker and the thinner chucking shanks having sidewalls identically spaced apart and divergent at identical angles and are to identical depths.

24. A drill-bit set according to claim 19, in which for each drill bit of the set at least one chucking groove is axially retaining and terminates short of the chucking-shank end of the drill bit and communicates with said end via an introduction groove of cross-section less than the chucking-groove cross-section, and in which the drill bit with the thickest chucking shank has chucking-groove bottoms each of which is characterized by a longitudinal trough of section substantially congruent with the introduction-groove section, and in which the drill bit with the thinnest chucking shank has chucking grooves of cross-section substantially congruent with that of said trough, the axially retaining chucking groove of the drill bit with thinnest chucking shank communicating with said end thereof via an introduction groove of cross-section less than the chucking-groove cross-section thereof.

* * * * *

UNITED STATES PATENT AND TRADEMARK OFFICE
CERTIFICATE OF CORRECTION

PATENT NO.   :   4,702,651

DATED        :   October 27, 1987

INVENTOR(S)  :   Werner Kleine

It is certified that error appears in the above-identified patent and that said Letters Patent is hereby corrected as shown below:

The sheets of drawings consisting of Figs. 3 to 7, inclusive should be added as shown on the attached sheets.

Signed and Sealed this

Twenty-first Day of June, 1988

Attest:

DONALD J. QUIGG

Attesting Officer

Commissioner of Patents and Trademarks

Patent No. 4,702,651

Werner Kleine